UNITED STATES PATENT OFFICE.

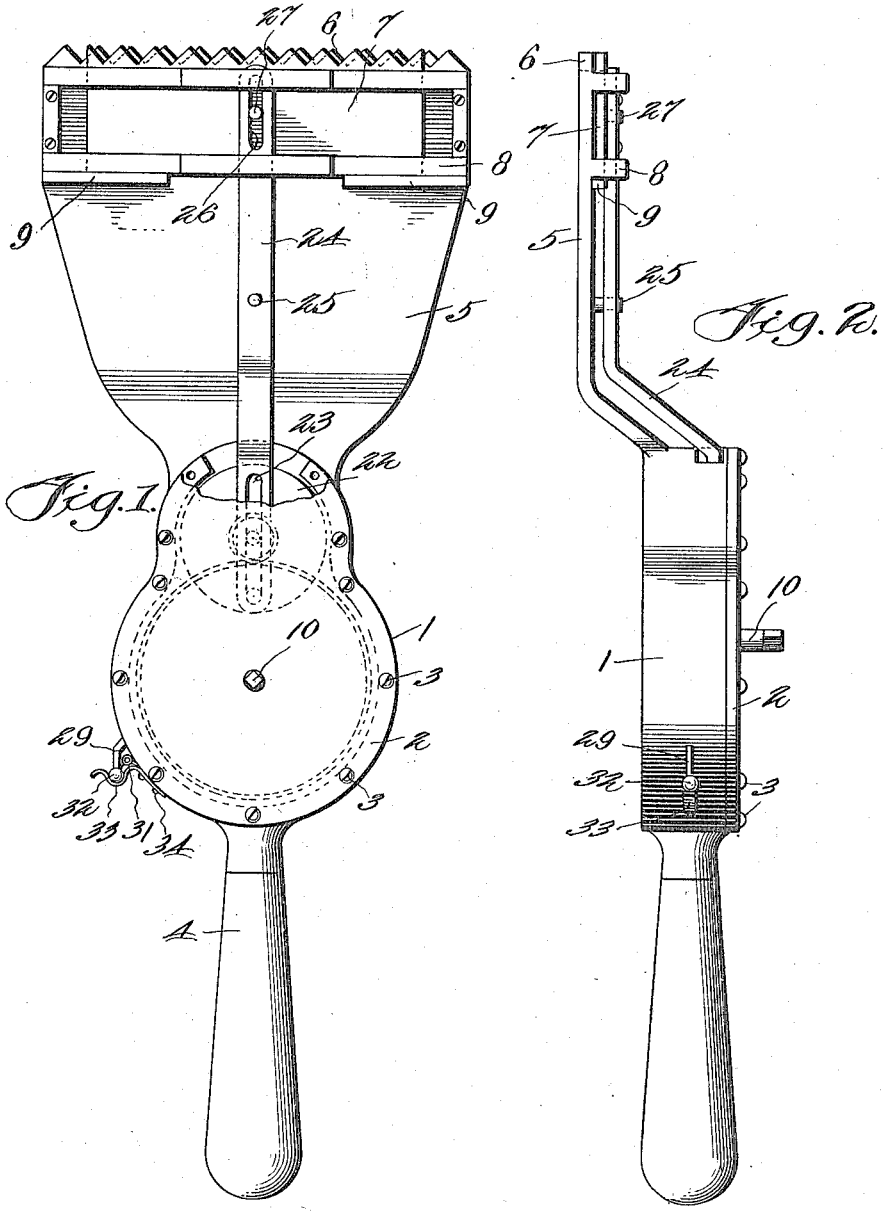

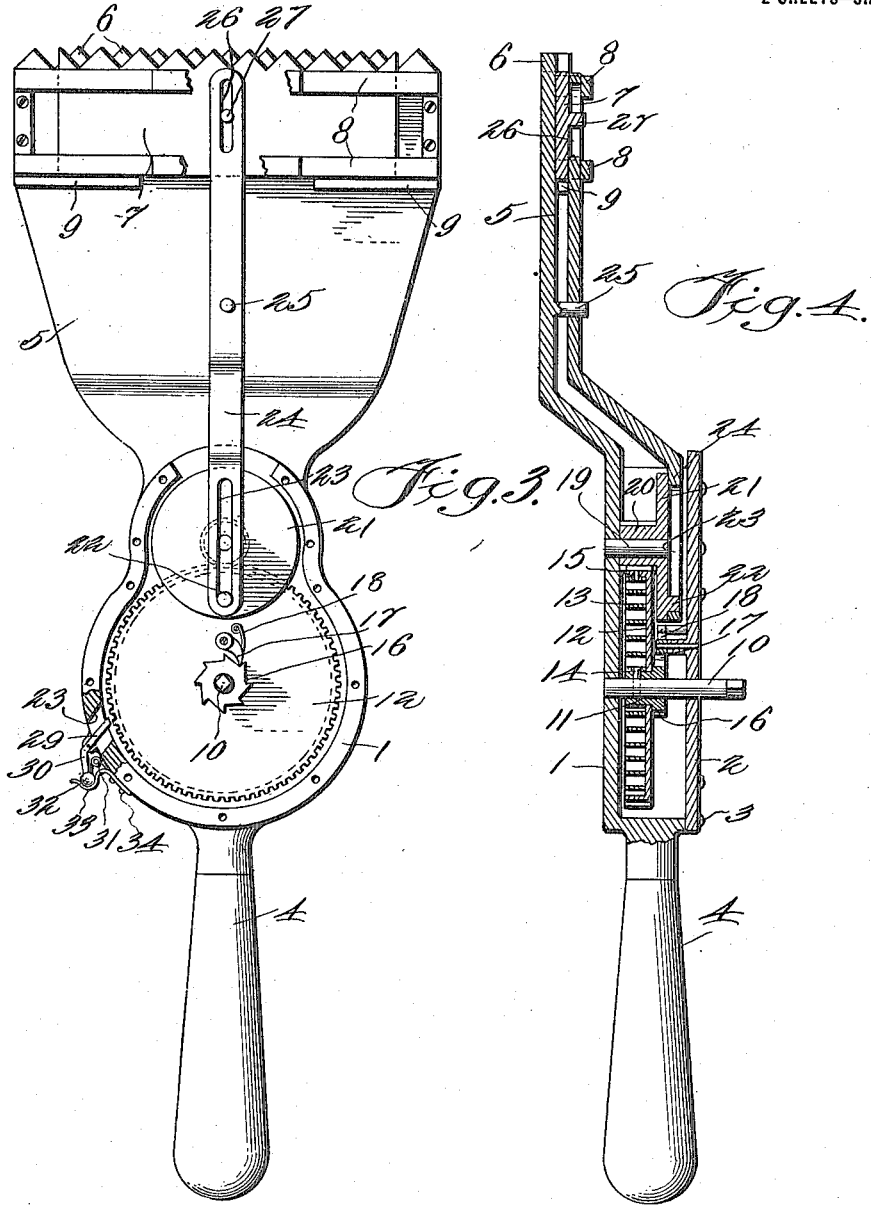

LUTHER H. CRIBBS, OF DADE CITY, FLORIDA.

ANIMAL-SHEARS.

1,221,292. Specification of Letters Patent. Patented Apr. 3, 1917.

Application filed August 24, 1916. Serial No. 116,575.

*To all whom it may concern:*

Be it known that I, LUTHER H. CRIBBS, a citizen of the United States, residing at Dade City, in the county of Pasco and State of Florida, have invented certain new and useful Improvements in Animal-Shears, of which the following is a specification.

My invention relates broadly to animal shearing instruments, and more particularly to horse shears.

As the primary object, this invention contemplates the provision of automatically actuated cutting means so arranged as to efficiently clip the hair from animals especially horses, and is desirable by livery stable keepers for shearing horses as well as by farmers for clipping their live stock.

The features of the invention reside in the specific construction, combination and arrangement of parts which will be later set forth and which gives to the device simplicity, efficiency and durability.

Other features as well as the nature, characteristic features and scope of my invention will be more readily understood from the following description taken in connection with the accompanying drawings and pointed out in the claim forming a part of this specification.

In the drawings:

Figure 1 is a front elevation of my invention.

Fig. 2 is a side elevation.

Fig. 3 is a front elevation similar to Fig. 1, the cover removed and part of the casing shown in section to illustrate the construction of the controlling means.

Fig. 4 is a vertical section of my invention.

Referring more particularly to the drawings in which similar reference numerals designate like and corresponding parts throughout the various views, I provide a casing 1 which is substantially shaped like an oval, a cover 2 being removably associated therewith through the medium of a suitable fastening device 3. A handle 4 projects from one end of the casing and serves to permit of the ready manipulation of the device when in use. A blade 5 is offset from the outer end of the casing at a point diametrically opposite the handle while the extreme free end of the blade is serrated to provide teeth 6 to consequently provide a stationary knife of the cutting means. Arranged adjacent the outer end of the blade 5 is a movable serrated knife blade 7, said knife being guided during its sliding movement by guides 8 arranged adjacent the upper surface of the movable knife and near the respective longitudinal edges thereof and also by other guides 9 arranged adjacent the inner edge of the movable knife as illustrated to advantage in the drawings.

In order to reciprocate the movable serrated knife blade 7 I have rotatably and transversely mounted a shaft 10 in the casing and the cover. A collar 11 is rigidly mounted on the casing and in turn serves to rotatably support a large gear 12, the latter being recessed to permit of the spiral spring 13 being arranged therein and about the collar. The inner end of the spring is rigidly connected to the collar by a suitable fastening device 14, while the outer end of the spring is rigidly connected to the gear as indicated by the numeral 15. A suitable key (not shown) may be employed for rotating the shaft 10 to consequently wind the spring and in order to facilitate this winding of the spring I have formed a ratchet wheel 10 integral at one end of the collar, said wheel being engageable by a bolt 17 pivotally mounted on the inner face of the cover 2 and held in engagement with the wheel by means of a spring 18, also connected to the cover. A stub shaft 19 is now rigidly mounted adjacent the outer end of the casing and has a pinion 20 rotatably mounted thereabout and meshing with the teeth of the large gear 12. A disk 21 is integral with one edge of the pinion while a pin 22 is arranged eccentrically on the outer face of the disk so as to operate in the slot 23 in the inner end of the lever 24. This lever conforms substantially to the contour of the casing 1 and the blade 5 being pivotally mounted about a stud 25 on the blade while the outer end is also provided with a longitudinal slot 26 engageable about the pin 27 on the movable knife 7. As is apparent, the guides 8 are raised intermediate their ends to consequently guide the swinging movement of the lever.

In order to control the actuation of the large gear 12 I have provided one portion of the periphery of the casing with a slot 28 and have pivotally mounted a pawl 29 between ears 30 integral with the casing and adjacent the sides of the slot. The inner end of this pawl is adapted to engage the teeth of the gear 12. A spring 31 is normally adapted to hold the inner end of the pawl in engagement with the teeth while the outer end of the pawl is provided with a knob 32 which at times, is adapted to be engaged by a retaining catch 33 rigidly mounted as at 34 in the outer peripery of the casing, whereby this pawl is held from engagement with the gear 12 to permit it to rotate.

The operation of my invention is as follows:—

Assuming that the shaft has been rotated and the spring 13 is wound by withdrawing the pawl 29 from engagement with the teeth 12 and in turn placing it in engagement with the retaining catch 33, the tension of the spring 13 will rotate the gear 12 which being enmeshed with the pinion 20 rotates this pinion as well as the disk 21. Inasmuch as the pin 22 on the disk is in engagement with the slot 23 in the lever 24, a rotary motion of the disk will impart a swinging movement to the pivotally mounted lever 24 and consequently because of the slot 26 in the outer end of the lever which is arranged about the pin 27 on the movable knife 7, this swinging movement of the lever imparts reciprocatory movement to the serrated knife blade 7 causing the latter to coöperate with the stationary blade and effectively clip hair from animals. It is apparent that the guides 8 and 9 guide the stationary movement of the movable knife. At the desired time the pawl 29 may be released so as to engage the gear 12 and thereby prevent actuation in the device.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:

An animal shearing device including a casing, a handle projecting therefrom, a stationary blade integral with and offset from a portion of the casing opposite to the handle, a movable blade coöperating with the stationary blade, guiding bars for the movable blade mounted on the stationary blade, a lever offset intermediate its ends and pivoted to the stationary blade having one end in loose connection with the movable blade and the other end arranged within the casing, a spring actuated gear rotatably mounted in the casing, a pawl pivotally mounted in the casing for engagement with the teeth on the gear for preventing rotation of the gear, a retaining catch for holding the pawl out of engagement with the gear to permit of rotation thereof, and a disk mounted in the casing and rotatable by the large gear and eccentrically connected to the inner end of the lever for imparting a reciprocatory movement to the movable knife.

In testimony whereof I affix my signature in presence of two witnesses.

LUTHER H. CRIBBS.

Witnesses:
JAS. E. TURNER,
E. S. BLOCKER.

Copies of this patent may be obtained for five cents each, by addressing the "Commissioner of Patents, Washington, D. C."